United States Patent
Higuchi et al.

(10) Patent No.: US 11,565,510 B2
(45) Date of Patent: Jan. 31, 2023

(54) LAYERED BODY, BAG AND LITHIUM ION CELL

(71) Applicant: AGC Inc., Chiyoda-ku (JP)

(72) Inventors: Yoshiaki Higuchi, Chiyoda-ku (JP); Seigo Kotera, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 284 days.

(21) Appl. No.: 15/707,327

(22) Filed: Sep. 18, 2017

(65) Prior Publication Data

US 2018/0009204 A1    Jan. 11, 2018

Related U.S. Application Data

(63) Continuation of application No. PCT/JP2016/057820, filed on Mar. 11, 2016.

(30) Foreign Application Priority Data

Mar. 18, 2015 (JP) .............................. JP2015-055091
Aug. 19, 2015 (JP) .............................. JP2015-162054

(51) Int. Cl.
  B65D 65/40 (2006.01)
  H01M 50/116 (2021.01)
  (Continued)

(52) U.S. Cl.
  CPC ............... B32B 27/30 (2013.01); B32B 7/12 (2013.01); B32B 15/08 (2013.01); B32B 15/18 (2013.01);
  (Continued)

(58) Field of Classification Search
  None
  See application file for complete search history.

(56) References Cited

U.S. PATENT DOCUMENTS

2009/0291243 A1    11/2009 Kitahara et al.

FOREIGN PATENT DOCUMENTS

EP    1 897 686 A1    3/2008
JP    2000-63752    2/2000
(Continued)

OTHER PUBLICATIONS

Kamitori et al. (JP 2012076295 A, machine translation).*
(Continued)

*Primary Examiner* — Haixia Zhang
(74) *Attorney, Agent, or Firm* — Oblon, McClelland, Maier & Neustadt, L.L.P.

(57) ABSTRACT

To provide a laminate which has a heat sealing property, a barrier property and mechanical strength, of which elution of impurities from the surface to be in contact with a chemical solution is suppressed, and of which peeling and the like hardly occur at the sealed portion of a bag and at the interfaces between the layers of the laminate when exposed to high temperature, a bag using it and a lithium ion battery. A laminate 10 comprising a first layer 12 containing a fluororesin, a second layer 14 containing a barrier material, a third layer 16 containing a fluororesin and a fourth layer 18 containing a polyamide in this order, wherein each of the fluororesin in the first layer 12 and the fluororesin in the third layer 16 is a fluororesin having a melting point of from 160 to 230° C. and having adhesive functional groups.

11 Claims, 1 Drawing Sheet

(51) Int. Cl.
    *H01M 50/124* (2021.01)
    *B32B 27/30* (2006.01)
    *B32B 27/34* (2006.01)
    *B65D 81/24* (2006.01)
    *B32B 27/08* (2006.01)
    *B32B 15/20* (2006.01)
    *B32B 15/18* (2006.01)
    *B32B 27/32* (2006.01)
    *B32B 7/12* (2006.01)
    *B32B 15/08* (2006.01)
    *H01M 10/0525* (2010.01)

(52) U.S. Cl.
    CPC .............. *B32B 15/20* (2013.01); *B32B 27/08* (2013.01); *B32B 27/304* (2013.01); *B32B 27/306* (2013.01); *B32B 27/322* (2013.01); *B32B 27/34* (2013.01); *B65D 65/40* (2013.01); *B65D 81/24* (2013.01); *H01M 10/0525* (2013.01); *H01M 50/116* (2021.01); *H01M 50/124* (2021.01); *B32B 2255/06* (2013.01); *B32B 2255/10* (2013.01); *B32B 2255/205* (2013.01); *B32B 2255/24* (2013.01); *B32B 2307/306* (2013.01); *B32B 2307/31* (2013.01); *B32B 2307/50* (2013.01); *B32B 2307/5825* (2013.01); *B32B 2307/7244* (2013.01); *B32B 2307/7246* (2013.01); *B32B 2307/7265* (2013.01); *B32B 2439/46* (2013.01); *B32B 2439/80* (2013.01); *B32B 2457/10* (2013.01)

(56) References Cited

FOREIGN PATENT DOCUMENTS

| | | |
|---|---|---|
| JP | 2001-48246 | 2/2001 |
| JP | 4120527 | 7/2008 |
| JP | 4662429 | 3/2011 |
| JP | 2012-76295 | 4/2012 |
| JP | 2012-106494 | 6/2012 |
| JP | 2014-238978 | 12/2014 |
| TW | 201325874 A1 | 7/2013 |
| WO | WO 01/058686 A1 | 8/2001 |
| WO | WO 2006/134764 A1 | 12/2006 |

OTHER PUBLICATIONS

Ojiri et al. (JP 2014238978 A, machine translation).*
International Search Report dated May 10, 2016 in PCT/JP2016/057820, filed on Mar. 11, 2016.

* cited by examiner

LAYERED BODY, BAG AND LITHIUM ION CELL

TECHNICAL FIELD

The present invention relates to a laminate, a bag and a lithium ion battery.

BACKGROUND ART

A laminate to be used for a bag containing a chemical solution (such as an electrolytic solution, a medical drug solution and a chemical solution for photolithography), such as an exterior of a lithium ion battery or a chemical solution bag is required to have, for example, the following properties.

It has a heat bonding property (hereinafter sometimes referred to as "heat sealing property") when the peripheries of the laminate are heat-sealed to form a bag.

It has a barrier property such that it hardly transmits specific substances (such as water vapor and oxygen).

It has a mechanical strength so as to protect the bag itself (that is, the bag is hardly broken e.g. by piercing).

As a laminate having such properties, for example, the following are proposed.

(1) A laminate for an exterior of a lithium ion battery, comprising acid-modified polypropylene layer (heat-sealable resin layer)/chemical conversion treatment layer (adhesive layer)/fluororesin layer (barrier layer)/chemical conversion treatment layer (adhesive layer)/aluminum foil (barrier layer)/chemical conversion treatment layer (adhesive layer)/urethane adhesive (adhesive layer)/polyamide layer (protective layer) (Patent Document 1).

(2) A laminate for a chemical solution bag comprising polypropylene layer (heat-sealable resin layer)/urethane adhesive (adhesive layer)/oxygen-scavenging resin layer (barrier layer)/urethane adhesive (adhesive layer)/ethylene-vinyl alcohol copolymer layer (barrier layer)/urethane adhesive (adhesive layer)/polyamide layer (protective layer) (Patent Document 2).

PRIOR ART DOCUMENTS

Patent Documents

Patent Document 1: Japanese Patent No. 4662429
Patent Document 2: JP-A-2001-048246

DISCLOSURE OF INVENTION

Technical Problem

A laminate to be used for a bag containing a chemical solution, may sometimes be required to further have the following properties.

Elution of impurities from a surface to be in contact with the chemical solution (the heat-sealable resin layer side) is suppressed.

A lithium ion battery may reach a high temperature by excessive charge and discharge or by runaway reaction and may burst. To prevent this, to a lithium ion battery, a shutdown function by blocking melting of the separator in the lithium ion battery is imparted. The shutdown temperature is determined by the melting point of the material in the laminate and is usually set to about 130 to 150° C. Accordingly, in a case where the bag is a bag for an exterior of a lithium ion battery, the laminate is required such that when exposed to the shutdown temperature, peeling and the like will hardly occur at the sealed portion of the bag and at the interfaces between the layers of the laminate.

The chemical solution bag may be heat-sterilized at high temperature. Accordingly, in a case where the bag is a bag for a chemical solution bag, the laminate is required to be such that when subjected to commonly employed high pressure steam sterilization (126° C., 15 minutes) or dry heat sterilization (135° C. to 145° C., 3 to 5 hours), peeling and the like will hardly occur at the sealed portion and at the interface between the layers of the laminate.

However, the above laminates (1) and (2) have the following problems.

Impurities are likely to be eluted from the heat-sealable resin layer itself or from the adhesive layer between the heat-sealable resin layer and the barrier layer to the chemical solution.

Since the heat-sealable resin layer has low heat resistance, peeling is likely to occur at the sealed portion of the bag when exposed to high temperature.

Since the urethane adhesive has low heat resistance, peeling is likely to occur at the adhesive layer composed of the urethane adhesive when exposed to high temperature.

It is an object of the present invention to provide a laminate which has a heat sealing property, a barrier property and mechanical strength, of which elution of impurities from the surface to be in contact with a chemical solution is suppressed, and of which peeling and the like hardly occur at the sealed portion of a bag and at the interfaces between the layers when exposed to high temperature, a bag using it and a lithium ion battery.

Solution to Problem

The present invention provides a laminate, a bag and a lithium ion battery having the following constitutions [1] to [14].

[1] A laminate comprising a first layer containing a fluororesin, a second layer containing a barrier material, a third layer containing a fluororesin and a fourth layer containing a polyamide, the first layer, the second layer, the third layer and the fourth layer being laminated in this order adjacent to one another, wherein each of the fluororesin in the first layer and the fluororesin in the third layer is a fluororesin having a melting point of from 160 to 230° C. and having the following adhesive functional groups:

adhesive functional group: at least one type of functional group selected from the group consisting of a carboxy group, an acid anhydride group, a carboxylic acid halide group, an epoxy group, a hydroxy group, an amino group, a mercapto group, a carbonate bond, an amide bond, a urethane bond, a urea bond, an ester bond and an ether bond.

[2] The laminate according to [1], wherein the fluororesin having the adhesive functional groups is a copolymer having units derived from ethylene and units derived from tetrafluoroethylene, a copolymer having units derived from tetrafluoroethylene and units derived from a perfluoro(alkyl vinyl ether), a polymer having units derived from vinylidene fluoride, or a polymer having units derived from vinyl fluoride.

[3] The laminate according to [1] or [2], wherein the fluororesin having the adhesive functional groups is a copolymer having units derived from ethylene, units derived from tetrafluoroethylene and units derived from a monomer having the adhesive functional group, a copolymer having units derived from tetrafluoroethylene, units derived from a perfluoro(alkyl vinyl ether) and units derived from a monomer having the adhesive functional group, a copolymer having units derived from vinylidene fluoride and units derived from a monomer having the adhesive functional group, or a copolymer having units derived from vinyl fluoride and units derived from a monomer having the adhesive functional group.

[4] The laminate according to [3], wherein each of the fluororesin in the first layer and the fluororesin in the third layer is composed of a copolymer having units derived from ethylene, units derived from tetrafluoroethylene and units derived from a monomer having the adhesive functional group.

[5] The laminate according to [1] or [2], wherein the fluororesin having the adhesive functional groups is a copolymer having units derived from ethylene, units derived from tetrafluoroethylene and a terminal group having the adhesive functional group, a copolymer having units derived from tetrafluoroethylene, units derived from a perfluoro(alkyl vinyl ether) and a terminal group having the adhesive functional group, a copolymer having units derived from vinylidene fluoride and a terminal group having the adhesive functional group, or a copolymer having units derived from vinyl fluoride and a terminal group having the adhesive functional group.

[6] The laminate according to [5], wherein each of the fluororesin in the first layer and the fluororesin in the third layer is composed of a copolymer having units derived from ethylene, units derived from tetrafluoroethylene and a terminal group having the adhesive functional group.

[7] The laminate according to any one of [1] to [6], wherein the barrier material is a metal or a non-gas-permeable resin.

[8] The laminate according to [7], wherein the barrier material is at least one member selected from the group consisting of aluminum, an aluminum alloy, stainless steel, an ethylene/vinyl alcohol copolymer, polyvinyl alcohol, a butenediol/vinyl alcohol copolymer, polychlorotrifluoroethylene, an ethylene/chlorotrifluoroethylene copolymer and polyvinylidene fluoride.

[9] The laminate according to any one of [1] to [8], wherein the second layer contains at least one layer selected from the group consisting of a metal layer, a non-gas-permeable resin layer and a metal thin film-supporting resin layer.

[10] The laminate according to any one of [1] to [8], wherein the second layer contains a metal layer treated with a silane coupling agent.

[11] A bag comprising at least one laminate as defined in any one of [1] to [10], formed by heat-sealing the peripheries of the first layer.

[12] The bag according to [11], which is for an exterior of a lithium ion battery.

[13] The bag according to [11], which is for a chemical solution bag.

[14] A lithium ion battery comprising a battery element, an electrolytic solution, and an exterior containing the battery element and the electrolytic solution, wherein the exterior is a bag comprising at least one laminate as defined in any one of [1] to [10], formed by heat-sealing the peripheries of the first layer.

Advantageous Effects of Invention

According to the laminate and the bag of the present invention, they have a heat sealing property, a barrier property and mechanical strength, elution of impurities from the surface to be in contact with a chemical solution of the laminate and the bag is suppressed, and peeling and the like will hardly occur at the sealed portion of the bag and at the interfaces between the layers of the laminate when exposed to high temperature.

Of the lithium ion battery of the present invention, the exterior has heat sealing property, battier property and mechanical strength, elution of impurities from the surface to be in contact with the chemical solution is suppressed, and peeling and the like will hardly occur at the sealed portion of the exterior and at the interfaces between the layers of the exterior when exposed to high temperature.

DESCRIPTION OF EMBODIMENTS

Figure 1:
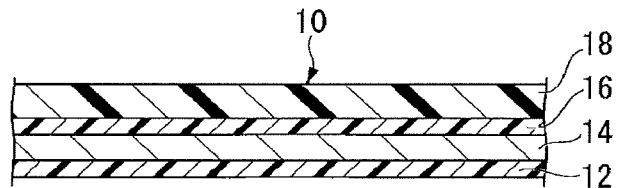
FIG. 1 is a cross-sectional view illustrating an example of a laminate of the present invention.

In this specification, meanings of the terms are as follows.

A "melting point" means a temperature corresponding to the maximum value of a melting peak measured by differential scanning calorimetery (DSC) method.

A "barrier material" means a material which is less likely to transmit specific substances (such as water vapor and oxygen) than materials contained in the first layer, the third layer and the fourth layer.

A "unit" means a moiety derived from a monomer present in a polymer, constituting the polymer. Further, one having a structure of a certain unit chemically converted after forming a polymer will also be referred to as a unit.

In some cases, a unit derived from each monomer will be called by a name of the monomer with "unit".

Now, materials constituting the respective layers will be described.

[Constituting Material]
(Fluororesin)

Each of the first layer and the third layer in the laminate of the present invention is a layer containing a specific fluororesin (hereinafter sometimes referred to as "fluororesin (A)").

The fluororesin (A) is a fluororesin having a melting point of from 160 to 230° C. and having the following adhesive functional groups.

Adhesive functional group: at least one functional group selected from the group consisting of a carboxy group, an acid anhydride group, a carboxylic acid halide group, an epoxy group, a hydroxy group, an amino group, a mercapto group, a carbonate bond, an amide bond, a urethane bond, a urea bond, an ester bond and an ether bond.

The fluororesin (A) contained in the first layer and the fluororesin (A) contained in the third layer may be the same or different from each other. In view of production of the laminate, the fluororesin (A) contained in the first layer and the fluororesin (A) contained in the third layer are preferably the same.

The melting point of the fluororesin (A) is from 160 to 230° C., particularly preferably from 180 to 230° C. When the melting point of the fluororesin (A) is at least the lower limit value of the above range, peeling and the like will hardly occur at the sealed portion of the bag and at the interfaces between adjacent layers when exposed to high temperature (for example, 150° C. or higher). When the melting point of the fluororesin (A) is at most the upper limit value of the above range, the first layer may be heat-sealed to another part of the first layer, or the first or third layer may be laminated to an adjacent layer at a relatively low temperature. For example, since the laminate can be produced at a relatively low temperature, deformation of the fourth layer containing a polyamide can be suppressed, and wrinkles and breakage of the laminate can be suppressed.

The fluororesin (A) has adhesive functional groups so as to impart heat-sealing property to a layer containing the fluororesin (A).

The adhesive functional group may be one derived from a monomer having an adhesive functional group, may be one derived from a polymerization initiator or a chain transfer agent, or may be one derived from a compound graft-polymerized to the fluororesin. The adhesive functional group in the polymer is preferably present in a unit derived from a monomer having an adhesive functional group or a terminal group derived from a polymerization initiator or a chain transfer agent, or may be present in both of them.

The adhesive functional group may be at least one member selected from the group consisting of a carboxy group, an acid anhydride group, a carboxylic acid halide group, an epoxy group, a hydroxy group, an amino group, a mercapto group, a carbonate bond, an amide bond, a urethane bond, a urea bond, an ester bond and an ether bond. In view of excellent heat-sealing property of the first layer, a carboxy group or an acid anhydride group is particularly preferred.

In a case where the adhesive functional group is present in the units derived from a monomer having the adhesive functional group, the proportion of the units derived from the monomer having the adhesive functional group based on all the units in the polymer is preferably from 0.01 to 5 mol %, particularly preferably from 0.05 to 1 mol %.

In a case where the adhesive functional group is present in a terminal group derived from a polymerization initiator or a chain transfer agent, the content of the terminal groups having the adhesive functional group per $1 \times 10^6$ carbon atoms in the main chain of the polymer is preferably from 3 to 1,000 groups, particularly preferably from 3 to 400 groups.

The fluororesin (A) is preferably the following polymer having adhesive functional groups in view of excellent heat sealing property and excellent forming property into a film or the like. That is, preferred is a copolymer (hereinafter referred to as "ETFE") having units derived from ethylene and units derived from tetrafluoroethylene (hereinafter sometimes referred to as "TFE"), a copolymer (hereinafter referred to as "PFA") having units derived from TFE and units derived from a perfluoroalkyl vinyl ether), a polymer (hereinafter referred to as "PVDF") having units derived from vinylidene fluoride or a polymer (hereinafter referred to as "PVF") having units derived from vinyl fluoride.

ETFE having adhesive functional groups is preferably ETFE having units derived from a monomer having an adhesive functional group or ETFE having a terminal group having an adhesive functional group (hereinafter such ETFEs will sometimes be generally referred to as "adhesive ETFE"). Likewise, PFA having adhesive functional groups is preferably PFA having units derived from a monomer having an adhesive functional group or PFA having a terminal group having an adhesive functional group, PVDF having adhesive functional groups is preferably PVDF having units derived from a monomer having an adhesive functional group and PVDF having a terminal group having an adhesive functional group, and PVF having adhesive functional groups is preferably PVF having units derived from a monomer having an adhesive functional group or PVF having a terminal group having an adhesive functional group.

The fluororesin (A) is particularly preferably ETFE having adhesive functional groups with a view to readily adjusting the melting point of the fluororesin (A) to be within the above range, and especially, particularly preferably adhesive ETFE.

In a case where adhesive ETFE has units derived from a monomer having an adhesive functional group, the monomer having an adhesive functional group is preferably a carboxy group, an acid anhydride group or a carboxylic acid halide group, or may be a monomer having at least two types of such adhesive functional groups. The monomer having an adhesive functional group is particularly preferably an unsaturated dicarboxylic acid anhydride. The unsaturated dicarboxylic acid anhydride may, for example, be itaconic anhydride, citraconic anhydride, 5-norbornene-2,3-dicarboxylic anhydride or maleic anhydride.

In a case where adhesive ETFE has a terminal group having an adhesive functional group, the adhesive functional group is preferably a mercapto group, a carbonate bond or an ester bond, particularly preferably a carbonate bond. The terminal group is more preferably a terminal group derived from a polymerization initiator, and the polymerization initiator is preferably a peroxycarbonate or a diacyl peroxide. Specifically, di-n-propyl peroxydicarbonate, diisopropyl peroxydicarbonate, bis(2-ethylhexyl) peroxydicarbonate, bis(4-t-butylcyclohexyl) peroxydicarbonate, isobutyryl peroxide, lauroyl peroxide or benzoyl peroxide may, for example, be mentioned.

Adhesive ETFE may have units derived from a monomer other than TFE and the monomer having an adhesive functional group as the case requires. Such other monomer may, for example, be a fluoroolefin (excluding tetrafluoroethylene) or a fluoro(alkyl vinyl ether).

Adhesive ETFE may, for example, be specifically the "fluororesin having functional groups" disclosed in WO2006/134764, the "adhesive functional group-containing fluororesin" disclosed in JP-A-2012-106494 or the "fluorinated ethylenic polymer having carbonyl groups" disclosed in WO2001/058686.

The layer containing the fluororesin (A) may contain a component other than the fluororesin (A) within a range not to impair the effects of the present invention.

Such other component may, for example, be a known additive for a resin, a fluororesin (ETFE, PFA or PVDF) having no adhesive functional group, a polyamide, an amino group-containing polymer, a fluorinated elastomer (a fluororubber having VDF units, a fluororubber having propylene units and TFE units, etc.) or its crosslinked product, or resin particles (particles of polytetrafluoroethylene, particles or polyether ether ketone, particles of polyphenylene sulfide, etc.).

The proportion of the fluororesin (A) in each of the first layer and the third layer is preferably from 5 to 100 mass %, more preferably from 20 to 100 mass %, particularly preferably from 50 to 100 mass % in the material (100 mass %) constituting the layer. When the proportion of the fluororesin (A) in the first layer is at least the lower limit value of the above range, elution of impurities from the first layer to the chemical solution can be sufficiently suppressed. Further, the first layer will be more excellent in the heat sealing property and the heat resistance. Further, in the case of the third layer, it will be more excellent in the bonding property to the adjacent layer and the heat resistance.

(Barrier Material)

The second layer in the laminate of the present invention is a layer containing a barrier material.

The barrier material may be properly selected from known barrier materials in accordance with the substance to be blocked. The barrier material is preferably a metal or a non-gas-permeable resin.

The metal material is preferably aluminum, an aluminum alloy or stainless steel in view of the barrier property, the corrosion resistance, etc. As the form of the metal material, a foil or a thin film is preferred for forming a layer. As a metal thin film, a metal vapor-deposited film or metal plating film supported on a support such as a resin film may, for example, be mentioned.

The non-gas-permeable resin is preferably an ethylene/vinyl alcohol copolymer (hereinafter sometimes referred to as "EVOH"), polyvinyl alcohol (hereinafter sometimes referred to as "PVOH"), a butenediol/vinyl alcohol copolymer (hereinafter sometimes referred to as "BVOH"), polychlorotrifluoroethylene (hereinafter sometimes referred to as "PCTFE"), an ethylene/chlorotrifluoroethylene copolymer (hereinafter sometimes referred to as "ECTFE") or PVDF in view of excellent barrier property and excellent forming property into a film. The barrier material may be a mixed resin of two or more non-gas-permeable resins, or may be a mixed resin of a non-gas-permeable resin and another resin.

In a case where the bag is for an exterior of a lithium ion battery, the bag is required to prevent infiltration of water vapor from the outside into the inside of the bag, and accordingly the barrier material is preferably a material having water vapor barrier property. The material having water vapor barrier property is preferably aluminum or stainless steel, particularly preferably aluminum. Aluminum may be high purity aluminum or may be an aluminum alloy. Further, the form of aluminum may be an aluminum foil or may be an aluminum vapor deposited film formed on the surface of a resin film such as a polyester film.

The second layer may contain a component other than the barrier material within a range not to impair the effects of the present invention.

In a case where the barrier material is a resin, such other component may, for example, be a known additive for a resin, a resin other than the barrier material, or an inorganic filler (particularly a plate filler).

The proportion of the barrier material in the layer containing the barrier material is preferably from 50 to 100 mass %, more preferably from 70 to 100 mass %, particularly preferably from 80 to 100 mass % in the layer (100 mass %) containing the barrier material. When the proportion of the barrier material is at least the lower limit value of the above range, infiltration of specific substances from the outside into the inside of the bag can be sufficiently prevented.

(Polyimide)

The polyamide contained in the fourth layer may, for example, be nylon 6, nylon 66, nylon 11, nylon 12, special nylon or a mixture thereof.

The fourth layer may contain a component other than polyamide within a range not to impair the effects of the present invention.

Such another component may, for example, be a known additive for a resin, or a resin other than the polyamide such as polyester (such as polyethylene terephthalate), polyolefin (such as an ethylene resin or a propylene resin), an acrylic resin or a linear thermoplastic polyurethane.

The proportion of the polyamide in the fourth layer is preferably from 20 to 100 mass %, more preferably from 50 to 100 mass %, particularly preferably from 70 to 100 mass % in the fourth layer (100 mass %). When the proportion of the polyamide in the fourth layer is at least the lower limit value of the above range, the laminate will be sufficiently excellent in the mechanical strength.

(Silane Coupling Agent)

The silane coupling agent used for forming the after-mentioned adhesion-accelerating layer is preferably a compound having a hydrolyzable silyl group and a group capable of forming a bond e.g. by a chemical reaction or a hydrogen bond with the fluororesin (A). The hydrolyzable silyl group is preferably an alkoxysilyl group, and in view of high hydrolysis rate, particularly preferably a methoxysilane or ethoxysilane.

The group capable of forming a bond e.g. by a chemical reaction or a hydrogen bond with the fluororesin (A) is preferably an amino group, an epoxy group, a methacrylic group or a mercapto group, and in view of excellent reactivity with the fluororesin (A), particularly preferably an amino group or an epoxy group.

In a case where the silane coupling agent is applied, it is preferably formed into a solution dissolved in water, an alcohol solvent (such as ethanol or isopropyl alcohol) or a mixed solvent of water and an alcohol solvent. The content of the silane coupling agent in the solution depends on the application method and the after-described post-treatment method and is preferably from 0.1 to 15 mass %, particularly preferably from 0.1 to 3 mass %. When it is at least the lower limit value of the above range, the adhesion to an adjacent layer will improve, and when it is at most the upper limit value of the above range, the silane coupling agent can be dissolved.

[Laminate]

The laminate of the present invention comprises a first layer containing the fluororesin (A), a second layer containing the barrier material, a third layer containing the fluororesin (A) and a fourth layer containing the polyamide.

The first layer, the second layer, the third layer and the fourth layer are laminated in this order adjacent to one another. For the purpose of further improving the strength or for another purpose, another layer (fifth layer) may be further be laminated on the fourth layer opposite from the third layer. On that occasion, a layer containing the fluororesin (A) may be disposed between the fourth layer and the fifth layer.

FIG. 1 is a cross-sectional view illustrating an example of the laminate of the present invention. The laminate 10 comprises a first layer 12 containing the fluororesin (A), a second layer 14 containing the barrier material adjacent to the first layer 12, a third layer 16 containing the fluororesin (A) adjacent to the second layer 14, and a fourth layer 18 containing a polyamide adjacent to the third layer 16.

(First Layer)

The first layer containing the fluororesin (A) is a heat-sealable resin layer having adhesion to the adjacent layer (the second layer and the like) and a heat sealing property to another part of the first layer.

<Thickness of First Layer>

The thickness of the first layer is preferably from 1 to 200 µm, more preferably from 1 to 100 µm, particularly preferably from 1 to 30 µm. When the thickness of the first layer is at least the lower limit value of the above range, infiltration of a chemical solution can be prevented by the first layer. When the thickness of the first layer is at most the upper limit value of the above range, the laminate will be excellent in flexibility.

(Second Layer)

The second layer is a barrier layer to prevent infiltration of specific substances (such as water vapor and oxygen) from the outside to the inside of the bag.

The second layer contains the barrier material. The second layer may be composed of a single layer containing the barrier material or may be composed of a plurality of layers including a layer containing the barrier material.

In a case where the second layer is composed of a plurality of layers, other layer may be a support layer in a case where the barrier material is a metal, or an adhesion-accelerating layer for improving the adhesion between the metal layer and the first layer or the third layer. By having the adhesion-accelerating layer, the heat sealing property will improve, and the layers can readily be fused and sealed even at low temperature, whereby the productivity will improve. The second layer having a support layer may, for example, be an aluminum vapor-deposited resin film (such as an aluminum vapor-deposited polyethylene terephthalate film (the polyethylene terephthalate film corresponds to the support layer)). The adhesion-accelerating layer may, for example, be a resin layer having affinity with the first layer or the third layer or a layer having a functional group capable of reacting with the adhesive functional group in the first layer or the third layer introduced to the surface.

A method of forming the adhesion-accelerating layer is not particularly limited, and for example, the following methods may be mentioned.

A method of applying to the surface of the metal layer a coating agent containing a resin having affinity with the first layer or the third layer or a resin having a functional group capable of reacting with the adhesive functional group in the first layer or the third layer, followed by drying.

A method of applying a chemical treatment such as boehmite treatment to the surface of the metal layer.

A method of applying a chemical treatment such as boehmite treatment to the surface of the metal layer.

A method of applying a silane coupling agent to the surface of the metal layer.

A method of applying electromagnetic energy or the like to the surface of the metal layer in the presence of a reactive gas.

As the method of forming the adhesion-accelerating layer, preferred is a method of applying a chemical treatment or a method of applying a silane coupling agent to the surface of the metal layer, whereby the adhesion-accelerating layer will be excellent in the compatibility with the first layer or the third layer and the time required for heat fusion will be shortened.

As a method of applying the silane coupling agent to the surface of the metal layer, a conventional application method such as spray coating or immersion coating may properly be employed.

In a case where the silane coupling agent as the above-described solution is applied, after the application, the silane coupling agent is solidified simultaneously with drying of the solvent. The metal layer may be washed with water before drying to wash away the silane coupling agent in excess (JP-A-2009-19266).

The amount of the silane coupling agent applied is preferably from 0.001 to 0.02 mg/cm$^2$ with a view to improving the adhesion to the first layer or the third layer.

In a case where the bag is for a chemical solution bag, the bag is required to prevent infiltration of oxygen from the outside to the inside of the bag, and accordingly the barrier material is preferably a material having oxygen barrier property. The material having oxygen barrier property is preferably a non-gas-permeable resin, particularly preferably a non-gas-permeable resin selected from the group consisting of EVOH, PVOH, BVOH, PCTFE, ECTFE and PVDF.

<Thickness of Second Layer>

In a case where the barrier material is a metal, the thickness of the second layer is preferably from 6 to 100 μm, particularly preferably from 6 to 30 μm.

In a case where the barrier material is a resin, the thickness of the second layer is preferably from 1 to 200 μm, more preferably from 10 to 100 μm, particularly preferably from 25 to 100 μm.

In a case where the thickness of the second layer is at least the lower limit value of the above range, infiltration of specific substances from the outside into the inside of the bag can be sufficiently prevented. When the thickness of the second layer is at most the upper limit value of the above range, the laminate will be excellent in the flexibility.

(Third Layer)

The third layer containing the fluororesin (A) is an adhesive layer having adhesion to adjacent layers (the second layer, the fourth layer and the like) and bonding them.

<Thickness of Third Layer>

The thickness of the third layer is preferably from 1 to 100 μm, more preferably from 1 to 50 μm, particularly preferably from 1 to 25 μm. When the thickness of the third layer is at least the lower limit value of the above range, the third layer will be more excellent in the adhesion to the adjacent layers. When the thickness of the third layer is at most the upper limit value of the above range, the laminate will be excellent in the flexibility.

(Fourth Layer)

The fourth layer containing the polyamide is a protective layer to protect the second layer and to increase the mechanical strength of the laminate.

<Thickness of Fourth Layer>

The thickness of the fourth layer is preferably from 10 to 100 μm, particularly preferably from 25 to 100 μm. When the thickness of the fourth layer is at least the lower limit value of the above range, the laminate will be sufficiently excellent in the mechanical strength. When the thickness of the fourth layer is at most the upper limit value of the above range, the laminate will be excellent in the flexibility.

(Method for Producing Laminate)

As a method for producing the laminate of the present invention, a method of heat-pressing the respective layers each formed into a film (heat lamination method), a method of melt-extruding materials of the respective layers by using a multilayer die (co-extrusion method) or a method of melt-extruding on a layer formed into a film a material of another layer (extrusion lamination method) may, for example, be mentioned. Two or more of such methods may be combined.

Otherwise, a preliminary laminate of adjacent two or three layers may be produced, and another layer is formed on one side or both sides of the preliminary laminate to produce the laminate of the present invention. Otherwise, two preliminary laminates may be produced and laminated to produce the laminate of the present invention. The preliminary laminate may be produced by the same method as above.

As specific examples of the method for producing the laminate of the present invention, for example, the following methods may be mentioned.

<Method (I)>
A fluororesin (A) film and an aluminum foil are heat-laminated to obtain a preliminary laminate comprising the first layer and the second layer.

The fluororesin (A) and the polyamide are co-extruded to obtain a preliminary laminate comprising the third layer and the fourth layer.

The above two preliminary laminates are heat-laminated so that the second layer and the third layer are in contact with each other to obtain the laminate of the present invention.

<Method (II)>
A fluororesin (A) film and an aluminum foil are heat-laminated to obtain a preliminary laminate comprising the first layer and the second layer.

A fluororesin (A) film and a polyamide film are heat-laminated to obtain a preliminary laminate comprising the third layer and the fourth layer.

The above two preliminary laminates are heat-laminated so that the second layer and the third layer are in contact with each other to obtain the laminate of the present invention.

<Method (III)>
The fluororesin (A), the barrier material (barrier resin) and the fluororesin (A) are co-extruded to obtain a preliminary laminate comprising the first layer, the second layer and the third layer.

The above preliminary laminate and a polyamide film are heat-laminated so that the third layer and the polyamide film are in contact with each other to obtain the laminate of the present invention.

<Method (IV)>
The fluororesin (A) is extrusion-laminated on the second layer to obtain a preliminary laminate comprising the first layer and the second layer.

A fluororesin (A) film and a polyamide film are heat-laminated to obtain a preliminary laminate comprising the third layer and the fourth layer.

The above two preliminary laminates are heat-laminated so that the second layer and third layer are in contact with each other to obtain the laminate of the present invention.

<Method (V)>
The fluororesin (A) is extrusion-laminated on the second layer to obtain a preliminary laminate comprising the first layer and the second layer.

The fluororesin (A) and the polyamide are co-extruded to obtain a laminate comprising the third layer and the fourth layer.

The above two preliminary laminates are heat-laminated so that the second layer and the third layer are in contact with each other to obtain the laminate of the present invention.

(Function and Mechanism)

The laminate of the present invention, which has the first layer containing the fluororesin (A) having adhesive functional groups as the outermost layer, has a heat sealing property.

Further, since it has the second layer containing the barrier material, it has a barrier property.

Further, since it has the fourth layer containing the polyamide, it is excellent in the mechanical strength.

Further, since its first layer to be in contact with a chemical solution when formed into a bag contains the fluororesin (A), elution of impurities from the surface to be in contact with the chemical solution can be prevented. Since the first layer and the second layer are adjacent to each other, elution of impurities from the surface to be in contact with the chemical solution can further be prevented.

Further, since the first layer contains the fluororesin (A) having a melting point of at least 160° C., peeling and the like will hardly occur at the sealed portion of the bag when exposed to high temperature.

Further, since the first layer and the third layer contain the fluororesin (A) having a melting point of at least 160° C., peeling and the like will hardly occur at the interfaces between the respective layers of the laminate when exposed to high temperature.

Further, since the fluororesin (A) has a melting point of at most 230° C., the laminate can be produced at a relatively low temperature. Accordingly, the shape and the properties of the respective layers will not be impaired.

[Bag]

The bag of the present invention comprises at least one laminate of the present invention, formed by heat-sealing the peripheries of the first layer. The first layer is disposed on the innermost side (the side to be in contact with a chemical solution), and the fourth layer is disposed outside the first layer, the second layer and the third layer.

The bag of the present invention may be a three side seal bag obtained by folding one laminate and heat-sealing the peripheries on three side of the overlapped first layer; or a four side seal bag obtained by overlaying two laminates and heat-sealing the peripheries on four side of the overlaid first layers.

The bag of the present invention may have a member other than the bag as the case requires.

Such other member may, for example, be an outlet of a chemical solution bag, a partition wall to divide the space into a plurality of parts, a printable film to facilitate display such as a label or a printed display seal, a memory to display the chemical solution amount, or a rubber stopper.

The bag of the present invention may be used for an exterior of a lithium ion battery, for a medical chemical solution bag, for a medical bottle, for a chemical solution bag for photolithography, etc.

The chemical solution bag may, for example, be an infusion solution bag (drip-peel solution, nutrient infusion solution (for example, vitamin infusion solution, amino acid infusion solution, Ringer's solution, fatty acid infusion solution, oral fluid nutrient food or electrolyte infusion solution), or blood product) or a dialysis bag (for example, peritoneal dialysis bag or hemodialysis bag).

The medical bottle may, for example, be a container of e.g. artificial blood vessel, blood circuits, syringe, hemodialyzer, cell separator or artificial lung; or a container for injection, discharge, storage or the like of body fluid, chemical solution or the like.

(Exterior of Lithium Ion Battery)

Figure 2:
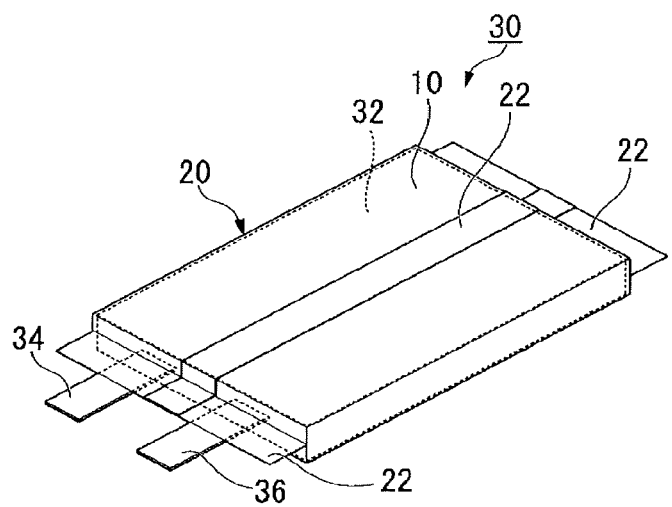
FIG. 2 is a perspective view illustrating an example of an exterior of a lithium ion battery which is an application of the bag of the present invention, and a lithium ion battery of the present invention.

FIG. 2 is a perspective view illustrating an example of an exterior of a lithium ion battery which is an application of the bag of the present invention. An exterior 20 is a three side seal bag obtained by folding and overlaying one laminate 10 and heat-sealing the peripheries on three sides of the overlaid first layer to form a sealed portion 22 on three sides.

(Chemical Solution Bag)

Figure 3:
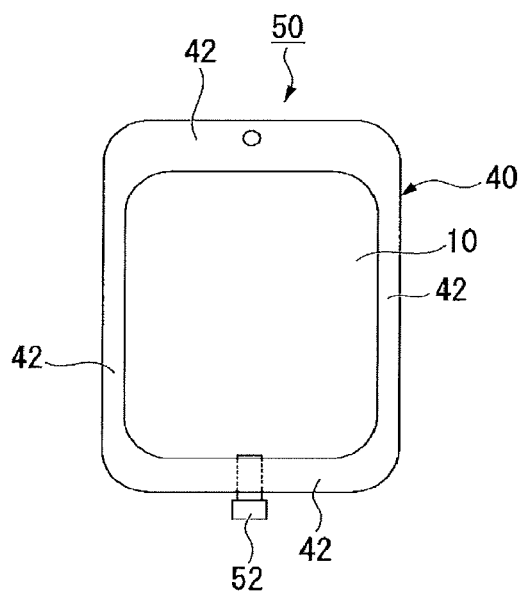
FIG. 3 is a front view illustrating an example of a chemical solution bag which is an application of the bag of the present invention.

FIG. 3 is a front view illustrating an example of a chemical solution bag which is an application of the bag of the present invention. A chemical solution bag 50 comprises a four side seal bag 40 formed by overlaying two laminates 10 and heat-sealing the peripheries on four sides of the overlaid first layers to form a sealed portion 42 on four sides, and an outlet 52 attached to the first layer in a state as sandwiched between the two laminates 10 at the sealed portion 42 on one side.

(Function and Mechanism)

The bag of the present invention, which is a bag comprising the laminate of the present invention, has a heat sealing property, a barrier property and mechanical strength, elution of impurities from the surface to be in contact with a chemical solution of the bag is prevented, and peeling and the like will hardly occur at the sealed portion of the bag and at the interfaces between the respective layers of the laminate when exposed to high temperature.

Another Embodiment

The bag of the present invention is not limited to the application to the bag as shown in Drawings so long as it is obtained by heat-sealing the peripheries of the first layer of at least one laminate of the present invention.

For example, an exterior of a lithium ion battery may be a four side seal bag formed by overlaying two laminates and heat-sealing the peripheries on four sides of the overlaid first layers to form a sealed portion on four sides.

[Lithium Ion Battery]

The lithium ion battery of the present invention comprises a battery element, an electrolytic solution, and an exterior comprising the bag of the present invention, containing the battery element and the electrolytic solution.

FIG. 2 is a perspective view illustrating an example of a lithium ion battery of the present invention. A lithium ion battery 30 comprises a battery element 32, an electrolytic solution (not shown) and an exterior 20 containing the battery element 32 and the electrolytic solution.

The battery element 32 comprises a positive electrode (not shown) comprising a positive electrode active material layer and a positive electrode current corrector, a negative electrode (not shown) comprising a negative electrode active material layer and a negative electrode current collector, a separator (not shown) disposed between the positive electrode and the negative electrode, a positive electrode terminal 32 extruding outside of the exterior 20, connected to the positive electrode, and a negative electrode terminal 36 extruding outside of the exterior 20, connected to the negative electrode. The positive electrode terminal 34 and the negative electrode terminal 36 are attached to the first layer in a state sandwiched between two laminates 10 at a sealed portion 22 on one side of the exterior 20.

The exterior 20 is a three side seal bag formed by folding and overlaying one laminate 10 and heat-sealing the peripheries on three sides of the overlaid first layer to form a sealed portion 22 on three sides.

(Function and Mechanism)

Since the lithium ion battery of the present invention comprises an exterior comprising the laminate of the present invention, the exterior has a heat sealing property, a barrier property and mechanical strength, elution of impurities from the surface to be in contact with the electrolytic solution is prevented, and peeling and the like will hardly occur at the sealed portion of the exterior and at the interfaces between the respective layers of the exterior when exposed to high temperature.

Another Embodiment

The lithium ion battery of the present invention is not limited to the lithium ion battery as shown in the Drawing so long as the exterior is a bag formed by heat-sealing the peripheries of the first layer of the laminate of the present invention.

EXAMPLES

Now, the present invention will be described in further detail with reference to Examples. However, it should be understood that the present invention is by no means restricted to such specific Examples.

Ex. 1 to 13 and 22 to 29 are Examples of the present invention, and Ex. 14 to 21 are Comparative Examples.

[Evaluation Methods]

(State of Production of Laminate)

The state when the laminate was produced was evaluated based on the following standard.

○ (Good): The laminate could be produced with no problem.

× (Poor): The fourth layer fused and shrinkage was observed.

(Production of Test Bag)

In Ex. 1 to 21 and 24 to 29, two sheets of laminate (50 mm×50 mm) were overlaid, and the peripheries (width: 10 mm) on three sides of the overlaid first layers were heat-sealed by a heat sealing machine (manufactured by Toyo Seiki Seisaku-Sho, Ltd., tradename: MINI TEST PRESS) at a temperature of 200° C. for one minute under a pressure of 2 MPa to obtain a test bag one side of which was open.

In Ex. 22 and 23, heat sealing was carried out by using as a heat sealing machine a foot-operated impulse sealer (Fik-200 one side heating type) manufactured by FUJIIMPULSE CO., LTD. under conditions as identified in Table 4. A film-form thermocouple was inserted into the impulse sealer, and the temperature of the thermocouple was at most 220° C. at the time of heat-sealing. In Ex. 23, heat sealing in Ex. 22 was repeated three times.

(Chemical Solution Resistance)

In a test bag one side of which was open, 2 mL of an electrolytic solution ($LiPF_6$ solution, concentration: 1 mol/L, solvent: ethylene carbonate (boiling point: 260.7° C.)/diethyl carbonate (boiling point: 126° C.)/dimethyl carbonate (boiling point: 90° C.)=1/1/1 (mass ratio)) was put, and the opening of the bag was heat-sealed by using a heat sealing machine at a temperature of 200° C. for one minute under a pressure of 2 MPa to obtain a four side seal bag containing the electrolytic solution.

The bag containing the electrolytic solution was immersed in a hot water bath at 85° C. for 2,200 hours. Whether peeling at the sealed portion at the periphery of the bag occurred or not was confirmed and evaluated based on the following standard.

○ (Good): No peeling occurred at the sealed portion at the periphery of the bag.

× (Poor): Peeling occurred at the sealed portion at the periphery of the bag.

(Solvent Remaining Ratio)

In a test bag one side of which was open, 5 mL of a solvent (ethylene carbonate/diethyl carbonate/dimethyl carbonate=1/1/1 (mass ratio)) was put, and the opening of the bag was heat-sealed by using a heat sealing machine at a temperature of 200° C. for one hour under a pressure of 2 MPa to obtain a four side seal bag containing the solvent.

The bag containing the solvent was immersed in a hot water bath at 60° C. for 98 hours. The solvent remaining ratio was obtained from the mass change of the bag containing the solvent between before and after immersion.

(Elution of Impurities)

After the test for the solvent remaining ratio, the solvent was collected from the bag, and impurities were analyzed by gas chromatography, and evaluation was made based on the following standard.

◯ (Good): No peak of impurities of 100 ppm or higher observed.

× (Poor): A peak of impurities of 100 ppm or higher observed.

(Peel Strength)

Two sheets of laminate (50 mm×50 mm) were overlaid, and the first layers of the laminate were entirely heat-laminated by using a flat plate pressing apparatus (manufactured by Toyo Seiki Seisaku-Sho, Ltd., tradename: MINI TEST PRESS) at a temperature of 200° C. for 3 minutes under a pressure of 2 MPa.

One sheet of laminate was fixed, and the edge of the other sheet of laminate was sandwiched in a chuck of a tensile tester, and 90° peel strength was measured under conditions of a sample width of 10 mm, a peel rate of 100 mm/min and a temperature of 25° C.

In Ex. 22 and 23, using the test bag as it was, one sheet of laminate was fixed and the edge of the other sheet of laminate was sandwiched in a chuck of a tensile tester, and the 90° peel strength was measured under conditions of a sample width of 10 mm, a peel rate of 100 mm/min. and a temperature of 25° C.

(High Temperature Peel Strength)

Two sheets of laminate (50 mm×50 mm) were overlaid, and the first layers of the laminate were entirely heat-laminated by using a flat plate pressing apparatus (manufactured by Toyo Seiki Seisaku-Sho, Ltd., tradename: MINI TEST PRESS) at a temperature of 200° C. for 3 minutes under a pressure of 2 MPa.

One sheet of laminate was fixed, and the edge of the other sheet of laminate was sandwiched in a chuck of a tensile tester, and the 90° peel strength was measured under conditions of a sample width of 10 mm, a peel rate of 100 mm/min. and a temperature of 150° C.

In Ex. 22 and 23, using the test bag as it was, one sheet of laminate was fixed and the edge of the other sheet of laminate was sandwiched in a chuck of a tensile tester, and the 90° peel strength was measured under conditions of a sample width of 10 mm, a peel rate of 100 mm/min. and a temperature of 150° C.

(High Temperature Liquid Leakage)

In a test bag one side of which was open, 5 mL of a solvent (ethylene carbonate) was put, and the opening of the bag was heat-sealed by using a heat sealing machine at a temperature of 200° C. for one minute under a pressure of 2 MPa to obtain a four side seal bag containing the solvent.

The bag containing the solvent was held at 150° C. for 24 hours. Whether liquid leakage from the sealed portion at the periphery of the bag occurred or not was confirmed, and evaluation was made based on the following standard.

◯ (Good): No leakage occurred from the sealed portion at the periphery of the bag.

× (Poor): Liquid leakage from the sealed portion at the periphery of the bag observed.

(Peel Strength Retention Ratio after Held at High Temperature)

A film (150 mm×150 mm, thickness: 50 μm) composed of the resin used for the third layer was sandwiched between two sheets of aluminum foil (150 mm×150 mm, manufactured by UACJ Corporation, 1085, thickness: 20 μm), followed by heat lamination using a flat plate pressing apparatus (manufactured by Toyo Seiki Seisaku-Sho, Ltd., tradename: MINI TEST PRESS) at a temperature of 200° C. for 5 minutes under a pressure of 2 MPa to obtain a test laminate. Two such test laminates were prepared.

Using one test laminate, one sheet of aluminum foil was fixed and the edge of the other sheet of aluminum foil was sandwiched in a chuck of a tensile tester, and the 90° peel strength was measured under conditions of a sample width of 10 mm, a peel rate of 100 mm/min and a temperature of 25° C.

The other test laminate was held at 120° C. for 100 hours, and the 90° peel strength was measured in the same manner. The peel strength retention ratio was obtained from a change of the peel strength between before and after being held at 120° C. for 100 hours.

[Material]

(Fluororesin Having Adhesive Functional Groups)

Fluororesin (A-1): In accordance with the method disclosed in Preparation Example 1 of WO2006/134764, a copolymer comprising TFE units/ethylene units/3,3,4,4,5,5,6,6,6-nonafluoro-1-hexene units/hexafluoropropylene units/itaconic anhydride units=44/48/0.8/8.0/0.2 (molar ratio) having a melting point of 190° C. was obtained.

Fluororesin (A-2) in accordance with the method disclosed in Synthesis Example 7 of WO2001/058686, a copolymer comprising TFE units/ethylene units/hexafluoropropylene units/perfluoro(1,1,5-trihydro-1-pentene) units=40.8/44.8/13.9/0.5 (molar ratio) having a melting point of 160° C. was obtained. This copolymer has a carbonate bond-containing terminal group derived from the polymerization initiator (di-n-propylperoxy dicarbonate). The number of adhesive functional groups is 303 per 1×10$^6$ carbon atoms in the main chain.

Fluororesin (A-3): In accordance with the method disclosed in Synthesis Example 8 of WO2001/058686, a copolymer comprising TFE units/ethylene units/hexafluoropropylene units/perfluoro(1,1,5-trihydro-1-pentene) units=46.2/43.8/9.5/0.5 (molar ratio) having a melting point of 190° C. was obtained. This copolymer has a carbonate bond-containing terminal group in the same manner as the fluororesin (A-2). The number of adhesive functional groups is 260 per 1×10$^6$ carbon atoms of the main chain.

Fluororesin (A-4): By the method disclosed in Example 3 of Japanese Patent No. 4120527, a copolymer comprising TFE units/ethylene units/3,3,4,4,4-pentafluoro-1-butene units/itaconic anhydride units=58.2/38.4/3.1/0.3 (molar ratio) and a copolymer comprising TFE units/ethylene units/3,3,4,4,4-pentafluoro-1-butene units=53.7/45.6/0.7 (molar ratio) were melt-mixed in a mass ratio of 20/80 to obtain a copolymer mixture having a melting point of 225° C.

Fluororesin (X-1): Adhesive ETFE (manufactured by Asahi Glass Company, Limited, Fluon® AH-2000, melting point: 240° C.). With respect to the number of adhesive functional groups of fluororesin (X-1), the infrared absorption area at 1,801 cm$^{-1}$ derived from the acid anhydride was normalized by the thickness of the film, and the area was compared with that of the fluororesin (A-4), whereupon the number was the same.

(Fluororesin Having No Adhesive Functional Group)

Fluororesin (Y-1): ETFE (manufactured by Asahi Glass Company, Limited, Fluon® C-88AXP, melting point: 260° C.).

Fluororesin (Y-2): ETFE (manufactured by Asahi Glass Company, Limited, Fluon® LM-730, melting point: 225° C.).

Fluororesin (Y-3): PFA (manufactured by Asahi Glass Company, Limited, Fluon® P-62XP, melting point: 305° C.).

(Other Resin Having Adhesive Property)

Adhesive resin (Z-1): Epoxy group-containing ethylene copolymer (manufactured by Sumitomo Chemical Company, Limited, Bondfast® 7M, melting point: 52° C.).

Adhesive resin (Z-2): Polyamide elastomer (manufactured by Ube Industries, Ltd., XPA9068F1, melting point: 176° C.).

Adhesive resin (Z-3): Adhesive polyolefin (manufactured by Mitsubishi Chemical Corporation, MOD IC® P502, melting point: 168° C.).

Adhesive resin (Z-4): Polyamide adhesive (manufactured by Henkel Japan Ltd., Macromelt® 6827, softening point: 153 to 163° C.).

(Barrier Material)

Aluminum foil, manufactured by UACJ Corporation, 1085, thickness: 20 μm.

Barrier resin (B-1): BVOH (manufactured by The Nippon Synthetic Chemical Industry Co., Ltd., G-Polymer® OKS-8049).

Barrier resin (B-2): PVOH (manufactured by The Nippon Synthetic Chemical Industry Co., Ltd., GOHSENOL® N-300).

Barrier resin (B-3): EVOH (manufactured by The Nippon Synthetic Chemical Industry Co., Ltd., Soarnol® DC3203).

Barrier rein (B-4): PCTFE (manufactured by Daikin Industries, Ltd., NEOFLON® M-300PL).

Barrier resin (B-5): ECTFE (manufactured by Solvay, Halar® 558).

(Polyamide)

Polyamide (C-1): Nylon 6 (manufactured by Ube Industries, Ltd., 1030B).

Polyamide (C-2): Nylon 11 (manufactured by ARKEMA, BESN P20TL).

Polyamide (C-3): Nylon 12 (manufactured by Ube Industries, Ltd., UBESTA XPA 3020GX6).

(Resin Film)

A single layer resin film used to constitute each layer was produced by a known forming method in a thickness as identified in Tables 1 to 3.

Ex. 1 to 21

Laminates in Ex. 1 to 21 were produced by methods as identified in Tables 1 to 3 among the following methods (I) to (V) under conditions as identified in Tables 1 to 3.

<Method (I)>

A resin film for constituting the first layer and an aluminum foil for constituting the second layer were heat-laminated by using a flat plate pressing apparatus under conditions (temperature, time and pressure) as identified in Tables 1 to 3 to obtain a preliminary laminate (1).

A resin for constituting the third layer and a resin for constituting the fourth layer were co-extruded by using two extruders (manufactured by TANABE PLASTICS MACHINERY CO., LTD., diameter: 30 mm) and a two-layer co-extrusion die (manufactured by TANABE PLASTICS MACHINERY CO., LTD.) under conditions (die temperature) as identified in Tables 1 to 3 to obtain a preliminary laminate (2).

The preliminary laminate (1) and the preliminary laminate (2) were heat-laminated so that the second layer and the third layer were in contact with each other by using a flat plate pressing apparatus under conditions (temperature, time and pressure) as identified in Tables 1 to 3 to obtain a laminate.

<Method (II)>

A preliminary laminate (1) was obtained in the same manner as in the method (I).

A resin film for constituting the third layer and a resin film for constituting the fourth layer were heat-laminated by using a flat plate pressing apparatus under conditions (temperature, time and pressure) as identified in Tables 1 to 3 to obtain a preliminary laminate (2).

The preliminary laminate (1) and the preliminary laminate (2) were heat-laminated so that the second layer and the third layer were in contact with each other by using a flat plate pressing apparatus under conditions (temperature, time and pressure) as identified in Tables 1 to 3 to obtain a laminate.

<Method (III)>

A resin for constituting the first layer, a resin for constituting the second layer and a resin for constituting the third layer were co-extruded by using three extruders (manufactured by TANABE PLASTICS MACHINERY CO., LTD., diameter: 30 mm) and a three-layer co-extrusion die (manufactured by TANABE PLASTICS MACHINERY CO., LTD.) under conditions (die temperature) as identified in Tables 1 to 3 to obtain a preliminary laminate (3).

The preliminary laminate (3) and a resin film for constituting the fourth layer were heat-laminated so that the third layer and the fourth layer were in contact with each other by using a flat plate pressing apparatus under conditions (temperature, time and pressure) as identified in Tables 1 to 3 to obtain a laminate.

<Method (IV)>

On an aluminum foil or a resin film for constituting the second layer, a resin for constituting the first layer was extrusion-laminated under a condition (temperature) as identified in Tables 1 to 3 to obtain a preliminary laminate (1).

A preliminary laminate (2) was obtained in the same manner as in the method (II).

The preliminary laminate (1) and the preliminary laminate (2) were heat-laminated so that the second layer and the third layer were in contact with each other by using a flat plate pressing apparatus under conditions (temperature, time and pressure) as identified in Tables 1 to 3 to obtain a laminate.

<Method (V)>

A preliminary laminate (1) was obtained in the same manner as in the method (IV).

A preliminary laminate (2) was obtained in the same manner as in the method (I).

The preliminary laminate (1) and the preliminary laminate (2) were heat-laminated so that the second layer and the third layer were in contact with each other by using a flat plate pressing apparatus under conditions (temperature, time and pressure) as identified in Tables 1 to 3 to obtain a laminate.

The 90° peel strength between the first layer and the second layer immediately after production of the preliminary laminate (1) in Ex. 1 was 10 N/cm at room temperature (sample width: 10 mm, peel rate; 100 mm/min.).

The 90° peel strength between the first layer and the second layer immediately after production of the preliminary laminate (1) in Ex. 8 was 10 N/cm at room temperature (sample width: 10 mm, peel rate: 100 mm/min.).

The above-described evaluations were carried out with respect to the laminates in Ex. 1 to 21. The evaluation results are shown in Tables 1 to 3.

TABLE 1

| | Layer constitution [μm] | Ex. 1 | Ex. 2 | Ex. 3 | Ex. 4 | Ex. 5 | Ex. 6 | Ex. 7 | Ex. 8 |
|---|---|---|---|---|---|---|---|---|---|
| First layer | Fluororesin (A-1) | 50 | 25 | 12.5 | 12.5 | 12.5 | — | — | — |
| | Fluororesin (A-2) | — | — | — | — | — | 12.5 | — | — |
| | Fluororesin (A-3) | — | — | — | — | — | — | 12.5 | — |
| | Fluororesin (A-4) | — | — | — | — | — | — | — | 12.5 |
| Second layer | Aluminum foil | 20 | 20 | 20 | 20 | 20 | 20 | 20 | 20 |
| Third layer | Fluororesin (A-1) | 50 | 25 | 12.5 | 12.5 | 12.5 | — | — | — |
| | Fluororesin (A-2) | — | — | — | — | — | 12.5 | — | — |
| | Fluororesin (A-3) | — | — | — | — | — | — | 12.5 | — |
| | Fluororesin (A-4) | — | — | — | — | — | — | — | 12.5 |
| Fourth layer | Polyamide (C-1) | 50 | 50 | 25 | — | — | 25 | 25 | 25 |
| | Polyamide (C-2) | — | — | — | 25 | — | — | — | — |
| | Polyamide (C-3) | — | — | — | — | 25 | — | — | — |
| Production | Method | I | I | I | II | II | I | I | I |
| | Preliminary laminate (1) Heat lamination | 200° C., 3 min., 0.4 MPa | | | | | | | |
| | Preliminary laminate (2) Co-extrusion | | 250° C. | | — | | | 250° C. | |
| | Heat lamination | — | | | 220° C. 3 min. 0.4 MPa | 200° C. 3 min. 0.4 MPa | | — | |
| | Heat lamination of preliminary laminate (1) and preliminary laminate (2) | 200° C. 1 min. 2 MPa | | | | | 180° C. 1 min. 2 MPa | 200° C. 1 min. 2 MPa | |
| Evaluation | State of production of laminate | ○ | ○ | ○ | ○ | ○ | ○ | ○ | ○ |
| | Chemical solution resistance | ○ | ○ | ○ | ○ | ○ | ○ | ○ | ○ |
| | Solvent remaining ratio [%] | 100 | 100 | 100 | 100 | 100 | 100 | 100 | 100 |
| | Elution of impurities | ○ | ○ | ○ | ○ | ○ | ○ | ○ | ○ |
| | Peel strength [N/cm] | 10 | 10 | 10 | 10 | 10 | 7 | 8 | 10 |
| | High temperature peel strength [N/cm] | 3 | 3 | 3 | 3 | 3 | 1.5 | 2 | 3 |
| | High temperature liquid leakage | ○ | ○ | ○ | ○ | ○ | ○ | ○ | ○ |
| | Peel strength retention ratio [%] after held at high temperature | 100 | 100 | 100 | 100 | 100 | 100 | 100 | 100 |

TABLE 2

| | Layer constitution [μm] | Ex. 9 | Ex. 10 | Ex. 11 | Ex. 12 | Ex. 13 | Ex. 14 | Ex. 15 |
|---|---|---|---|---|---|---|---|---|
| First layer | Fluororesin (A-1) | 12.5 | 12.5 | 12.5 | 12.5 | 12.5 | — | — |
| | Fluororesin (Y-1) | — | — | — | — | — | 12.5 | — |
| | Fluororesin (Y-2) | — | — | — | — | — | — | 12.5 |
| Second layer | Aluminum foil | — | — | — | — | — | 20 | 20 |
| | Barrier resin (B-1) | 25 | — | — | — | — | — | — |
| | Barrier resin (B-2) | — | 25 | — | — | — | — | — |
| | Barrier resin (B-3) | — | — | 25 | — | — | — | — |
| | Barrier resin (B-4) | — | — | — | 25 | — | — | — |
| | Barrier resin (B-5) | — | — | — | — | 25 | — | — |
| Third layer | Fluororesin (A-1) | 12.5 | 12.5 | 12.5 | 12.5 | 12.5 | — | — |
| | Fluororesin (Y-1) | — | — | — | — | — | 12.5 | — |
| | Fluororesin (Y-2) | — | — | — | — | — | — | 12.5 |
| Fourth layer | Polyamide (C-1) | 25 | 25 | 25 | 25 | 25 | 25 | 25 |
| Production | Method | III | III | IV | II | II | V | V |
| | Preliminary laminate (1) Heat lamination | — | | | 200° C., 3 min., 0.4 MPa | | — | |
| | Extrusion lamination | — | | 220° C. | | — | 280° C. | 260° C. |
| | Preliminary laminate (2) Co-extrusion | — | | | | | 260° C. | 250° C. |
| | Heat lamination | — | | | 200° C., 3 min., 0.4 MPa | | — | |
| | Heat lamination of preliminary laminate (1) and preliminary laminate (2) | — | | | 200° C., 1 min., 2 MPa | | | |
| | Preliminary laminate (3) Co-extrusion | 240° C. | | | — | | | |
| | Heat lamination of preliminary laminate (3) and fourth layer | 200° C., 3 min., 0.4 MPa | | | — | | | |
| Evaluation | State of production of laminate | ○ | ○ | ○ | ○ | ○ | ○ | ○ |
| | Chemical solution resistance | ○ | ○ | ○ | ○ | ○ | x | x |
| | Solvent remaining ratio [%] | 95 | 93 | 90 | 98 | 96 | Liquid leakage | Liquid leakage |
| | Elution of impurities | ○ | ○ | ○ | ○ | ○ | ○ | ○ |
| | Peel strength [N/cm] | 10 | 10 | 10 | 10 | 10 | 0.5 | 0.5 |
| | High temperature peel strength [N/cm] | 3 | 3 | 3 | 3 | 3 | 0.1 | 0.1 |
| | High temperature liquid leakage | ○ | ○ | ○ | ○ | ○ | x | x |
| | Peel strength retention ratio [%] after held at high temperature | 100 | 100 | 100 | 100 | 100 | — | — |

TABLE 3

| Layer constitution [μm] | | Ex. 16 | Ex. 17 | Ex. 18 | Ex. 19 | Ex. 20 | Ex. 21 |
|---|---|---|---|---|---|---|---|
| First layer | Fluororesin (A-1) | — | — | — | 12.5 | 12.5 | 12.5 |
| | Fluororesin (X-1) | — | — | 12.5 | — | — | — |
| | Fluororesin (Y-3) | 12.5 | — | — | — | — | — |
| | Fluororesin (Z-1) | — | 12.5 | — | — | — | — |
| Second layer | Aluminum foil | 20 | 20 | 20 | 20 | 20 | 20 |
| Third layer | Fluororesin (X-1) | — | — | 12.5 | — | — | — |
| | Fluororesin (Y-3) | 12.5 | — | — | — | — | — |
| | Fluororesin (Z-1) | — | 12.5 | — | — | — | — |
| | Fluororesin (Z-2) | — | — | — | 12.5 | — | — |
| | Fluororesin (Z-3) | — | — | — | — | 12.5 | — |
| | Fluororesin (Z-4) | — | — | — | — | — | 12.5 |
| Fourth layer | Polyamide (C-1) | 25 | 25 | 25 | 25 | 25 | 25 |
| Production | Method | V | V | I | I | I | I |
| | Preliminary Heat lamination laminate (1) | | — | 280° C. 3 min. 0.4 MPa | | 200° C. 3 min. 0.4 MPa | |
| | Extrusion lamination | 340° C. | 220° C. | | — | | |
| | Preliminary Co-extrusion laminate (2) | | | 250° C. | | | |
| | Heat lamination of preliminary laminate (1) and preliminary laminate (2) | | | 200° C., 1 min., 2 MPa | | | |
| Evaluation | State of production of laminate | ○ | ○ | x | ○ | ○ | ○ |
| | Chemical solution resistance | x | x | — | ○ | ○ | ○ |
| | Solvent remaining ratio [%] | Liquid leakage | Liquid leakage | — | 100 | 100 | 100 |
| | Elution of impurities | ○ | ○ | — | ○ | ○ | ○ |
| | Peel strength [N/cm] | 0.5 | 30 | — | 10 | 10 | 10 |
| | High temperature peel strength [N/cm] | 0.1 | 0.2 | — | 3 | 3 | 3 |
| | High temperature liquid leakage | x | x | — | ○ | ○ | ○ |
| | Peel strength retention ratio [%] after molding at high temperature | — | — | — | 70 | 18 | 35 |

In Ex. 1 to 13, since the first layer contains the fluororesin (A), the sealed portion did not peel by the chemical solution, elution of impurities from the surface in contact with the chemical solution was prevented, and the peel strength at the sealed portion was high. Further, liquid leakage from the sealed portion of the bag e.g. by peeling when exposed to high temperature did not occur. Further, since the third layer contains the fluororesin (A), the peel strength of the third layer after held at high temperature was not decreased.

In Ex. 14 to 16, since the first layer is composed of the fluororesin having no adhesive functional group, the sealed portion peeled by the chemical solution, and the peel strength at the sealed portion was low. Further, liquid leakage from the sealed portion of the bag e.g. by peeling when exposed to high temperature occurred.

In Ex. 17, the first layer is composed of a non-fluorinated adhesive resin, the sealed portion peeled by the chemical solution, and elution of impurities from the surface in contact with the chemical solution was significant. Further, liquid leakage from the sealed portion of the bag e.g. by peeling when exposed to high temperature occurred.

In Ex. 18, since the third layer is composed of an adhesive fluororesin having a high melting point, the temperature to which the fourth layer composed of the polyamide was exposed by heat lamination when the laminate was produced was high, and the fourth layer fused and shrinkage was observed.

In Ex. 19 to 21, the first layer had a sufficient function. However, since the third layer is composed of a non-fluorinated adhesive resin, the third layer deteriorated in a short time by holding the laminate at high temperature, and after the laminate was held at high temperature, peeling occurred between the second layer and the third layer. As a result, the aluminum foil was insufficient in the long-term heat resistance.

Ex. 22 and 23

A laminate was produced in the same manner as in Ex. 2, and the periphery was heat-sealed under conditions as identified in Table 4 to obtain a test bag.

The evaluation results are shown in Table 4.

TABLE 4

| | | Ex. 22 | Ex. 23 |
|---|---|---|---|
| Formation into bag | Impulse sealer | Heating for 4 seconds and pressurization for 10 seconds, once | Heating for 4 seconds and pressurization for 10 seconds, three times |
| Evaluation | State of production of laminate | ○ | ○ |
| | Chemical solution resistance | ○ | ○ |
| | Solvent remaining ratio [%] | 100 | 100 |
| | Elution of impurities | ○ | ○ |
| | Peel strength after formation into bag [N/cm] | 12.4 | 16.5 |
| | High temperature peel strength after formation into bag [N/cm] | 3.5 | 4.4 |
| | High temperature liquid leakage | ○ | ○ |
| | Peel strength retention ratio [%] after held at high temperature | 100 | 100 |

In Ex. 22 and 23, by using impulse sealer for heat sealing, the peel strength and the high temperature peel strength improved as compared with Ex. 2. This is considered to be brought about by an anchor effect due to microdeformation on the contact surface of the sealer and the sufficient temperature.

Ex. 24 to 26

Both surfaces of an aluminum foil used as the second layer were preliminarily surface-treated with a silane coupling agent.

A predetermined amount of a 3 mass % solution (solvent: a mixed solvent of water:ethanol=1:1 (mass ratio)) of aminopropyltrimethoxysilane (manufactured by Shin-Etsu Chemical Co., Ltd., KBM903) was dropped on one side of the aluminum foil and applied by a bar coater. Then, the aluminum foil was dried by heating at 120° C. for 5 minutes. Then, the other surface was treated in the same manner. The amount of the silane coupling agent applied was calculated from the amount of the solution applied, the sample area, and the coupling agent concentration of the solution, whereupon it was 0.0028 mg/cm$^2$.

A laminate was produced in the same manner as in Ex. 2 except that the aluminum foil was surface-treated and that vacuum lamination was conducted by using LM-50X50S manufactured by NPC under conditions as identified in Table 5 at the time of producing the laminate (1). The periphery was heat-sealed under conditions as identified in Table 5 to obtain a test bag.

The evaluation results are shown in Table 5.

TABLE 5

|  |  | Ex. 24 | Ex. 25 | Ex. 26 |
|---|---|---|---|---|
| Production | Laminate (1) Vacuum lamination | 175° C., 1 min., 0.1 MPa | 175° C., 3 min., 0.1 MPa | 175° C., 5 min., 0.1 MPa |
| Evaluation | State of production of laminate | ○ | ○ | ○ |
|  | Chemical solution resistance | ○ | ○ | ○ |
|  | Solvent remaining ratio [%] | 99 | 99 | 100 |
|  | Elution of impurities | ○ | ○ | ○ |
|  | Peel strength [N/cm] | 16.6 | 18.2 | 17.8 |
|  | High temperature peel strength [N/cm] | 4 | 4.3 | 4.4 |

TABLE 5-continued

|  | Ex. 24 | Ex. 25 | Ex. 26 |
|---|---|---|---|
| High temperature liquid leakage | ○ | ○ | ○ |
| Peel strength retention ratio [%] after held at high temperature | 100 | 100 | 100 |

In Ex. 24 to 26, since both surfaces of the aluminum foil were surface-treated with the silane coupling agent, the peel strength and the high temperature peel strength improved as compared with Ex. 2. When surface-treatment with the silane coupling agent is conducted, vacuum lamination is preferably carried out when the laminate (1) is produced, and the time for vacuum lamination is preferably from about 1 to about 5 minutes.

Ex. 27 to 29

A laminate was produced in the same manner as in Ex. 24 except that the solution used for the surface treatment of the aluminum foil was as identified in Table 6, and then a test bag was produced. The evaluation results are shown in Table 6.

TABLE 6

|  |  | Ex. 27 | Ex. 28 | Ex. 29 |
|---|---|---|---|---|
| Solution | Silane coupling agent | | KBM903 | |
|  | Solvent | Ethanol | Water:Ethanol = 1:1 (mass ratio) | Water |
|  | Concentration of silane coupling agent [mass %] | 0.05 | 0.5 | 0.05 |
|  | Amount of silane coupling agent applied [mg/cm$^2$] | 0.0014 | 0.008 | 0.0141 |
| Evaluation | State of production of laminate | ○ | ○ | ○ |
|  | Chemical solution resistance | ○ | ○ | ○ |
|  | Solvent remaining ratio [%] | 100 | 100 | 100 |
|  | Elution of impurities | ○ | ○ | ○ |
|  | Peel strength [N/cm] | 19.8 | 18.4 | 21.3 |
|  | High temperature peel strength [N/cm] | 5.0 | 4.7 | 5.5 |
|  | High temperature liquid leakage | ○ | ○ | ○ |
|  | Peel strength retention ratio [%] after held at high temperature | 100 | 100 | 100 |

Each of the laminates obtained in Ex. 27 to 29 was excellent in the peel strength and the high temperature peel strength, since both surfaces of the aluminum foil were surface-treated with the silane coupling agent.

INDUSTRIAL APPLICABILITY

The laminate of the present invention is useful as an exterior of a lithium ion battery, a material for a bag containing a chemical solution (such as an electrolytic solution, a medical chemical solution or a chemical solution for photolithography), such as a chemical solution bag, or an exterior material of a vacuum insulating material.

This application is a continuation of PCT Application No. PCT/JP2016/057820, filed on Mar. 11, 2016, which is based upon and claims the benefit of priority from Japanese Patent Application No. 2015-055091 filed on Mar. 18, 2015 and Japanese Patent Application No. 2015-162054 filed on Aug. 19, 2015. The contents of those applications are incorporated herein by reference in their entireties.

REFERENCE SYMBOLS

10: Laminate, 12: first layer, 14: second layer, 16: third layer, 18: fourth layer, 20: exterior, 22: sealed portion, 30: lithium ion battery, 32: battery element, 34: positive electrode terminal, 36: negative electrode terminal, 40: bag, 42: sealed portion, 50: chemical solution bag, 52: outlet.

What is claimed is:

1. A laminate comprising:
a first layer comprising a fluororesin, which is an outermost layer of the laminate;
a second layer formed of a barrier material, wherein the barrier material consists of at least one metal selected from the group consisting of aluminum, an aluminum alloy, and stainless steel, wherein the barrier material is, optionally, treated with a silane coupling agent;
a third layer comprising a fluororesin; and
a fourth layer comprising a polyamide, the first layer, the second layer, the third layer and the fourth layer being laminated in this order adjacent to one another,
the fluororesin in the first layer and the fluororesin in the third layer each having a melting point of from 160 to 230° C. and having an adhesive functional group which is at least one selected from the group consisting of a carboxy group, an acid anhydride group, a carboxylic acid halide group, an epoxy group, a hydroxy group, an amino group, a mercapto group, a carbonate bond, an amide bond, a urethane bond, a urea bond, an ester bond and an ether bond,
wherein the fluororesin in the first layer is a copolymer comprising units derived from ethylene and units derived from tetrafluoroethylene, a copolymer comprising units derived from tetrafluoroethylene and units derived from a perfluoro(alkyl vinyl ether), a polymer comprising units derived from vinylidene fluoride, or a polymer comprising units derived from vinyl fluoride; and
wherein the fluororesin in the third layer consists of a copolymer that is selected from the group consisting of:
1 a copolymer that consists of: an ethylene unit ($—CH_2CH_2—$); a tetrafluoroethylene unit ($—CF_2CF_2—$); a unit derived from a monomer having the adhesive functional group; and one or more units selected from the group consisting of a 3,3,4,4,5,5,6,6,6-nonafluoro-1-hexene unit, a hexafluoropropylene unit, a perfluoro(1,1,5-trihydro-1-pentene) unit and a pentafluoro-1-butene unit; and
2 a copolymer that consists of: an ethylene unit ($—CH_2CH_2—$); a tetrafluoroethylene unit ($—CF_2CF_2—$); and one or more units selected from the group consisting of a 3,3,4,4,5,5,6,6,6-nonafluoro-1-hexene unit, a hexafluoropropylene unit, a perfluoro(1,1,5-trihydro-1-pentene) unit and a pentafluoro-1-butene unit, the copolymer having a terminal group having the adhesive functional group;
wherein the copolymer that consists of the fluororesin in the third layer optionally further includes:
3 a copolymer that consists of: an ethylene unit ($—CH_2CH_2—$); a tetrafluoroethylene unit ($—CF_2CF_2—$); and one or more units selected from the group consisting of a 3,3,4,4,5,5,6,6,6-nonafluoro-1-hexene unit, a hexafluoropropylene unit, a perfluoro(1,1,5-trihydro-1-pentene) unit and a pentafluoro-1-butene unit.

2. The laminate according to claim 1, wherein the fluororesin in the first layer is a copolymer comprising units derived from ethylene, units derived from tetrafluoroethylene and units derived from a monomer having the adhesive functional group, a copolymer comprising units derived from tetrafluoroethylene, units derived from a perfluoro(alkyl vinyl ether) and units derived from a monomer having the adhesive functional group, a copolymer comprising units derived from vinylidene fluoride and units derived from a monomer having the adhesive functional group, or a copolymer comprising units derived from vinyl fluoride and units derived from a monomer having the adhesive functional group.

3. The laminate according to claim 1, wherein the fluororesin in the first layer is composed of a copolymer having units derived from ethylene, units derived from tetrafluoroethylene and units derived from a monomer having the adhesive functional group.

4. The laminate according to claim 1, wherein the fluororesin in the first layer is a copolymer comprising units derived from ethylene, units derived from tetrafluoroethylene and a terminal group having the adhesive functional group, a copolymer comprising units derived from tetrafluoroethylene, units derived from a perfluoro(alkyl vinyl ether) and a terminal group having the adhesive functional group, a copolymer comprising units derived from vinylidene fluoride and a terminal group having the adhesive functional group, or a copolymer comprising units derived from vinyl fluoride and a terminal group having the adhesive functional group.

5. The laminate according to claim 1, wherein the fluororesin in the first layer is composed of a copolymer having units derived from ethylene, units derived from tetrafluoroethylene and a terminal group having the adhesive functional group.

6. The laminate according to claim 1, wherein the barrier material is treated with the silane coupling agent.

7. A bag comprising at least one laminate as defined in claim 1, formed by heat-sealing peripheries of the first layer.

8. The bag according to claim 7, which is for an exterior of a lithium ion battery.

9. The bag according to claim 7, which is for a chemical solution bag.

10. A lithium ion battery comprising a battery element, an electrolytic solution, and an exterior containing the battery element and the electrolytic solution,
wherein the exterior is a bag comprising the laminate as defined in claim 1, formed by heat-sealing peripheries of the first layer.

11. The laminate according to claim 1, wherein the copolymer that consists of the fluororesin in the third layer is:
(i) a copolymer that consists of, an ethylene unit, a tetrafluoroethylene unit, a 3,3,4,4,5,5,6,6,6-nonafluoro-1-hexene unit, a hexafluoropropylene unit, and an itaconic anhydride unit as the unit derived from a monomer having the adhesive functional group;
(ii) a copolymer that consists of an ethylene unit, a tetrafluoroethylene unit, a hexafluoropropylene unit, and a perfluoro(1,1,5-trihydro-1-pentene) unit, and that has a carbonate bond-containing terminal group as the terminal group having the adhesive functional group; or
(iii) a melt-mixed copolymer that consists of:
a copolymer that consists of: an ethylene unit; a tetrafluoroethylene unit; a 3,3,4,4,4-pentafluoro-1-butene unit; and an itaconic anhydride unit as the unit derived from a monomer having the adhesive functional group; and a copolymer that consists of an ethylene unit; a tetrafluoroethylene unit; and a 3,3,4,4,4-pentafluoro-1-butene unit.

* * * * *